United States Patent Office 2,883,349
Patented Apr. 21, 1959

2,883,349
ANION EXCHANGE RESINS PREPARED IN THE PRESENCE OF PLASTICIZER AND POLYMER

Yoshio Tsunoda and Maomi Seko, Okatomi, Nobeoka-shi, Miyazaki-ken, Japan, assignors to Asahi Chemical Industry Co., Ltd., Osaka, Japan No Drawing. Application August 24, 1954
Serial No. 451,974

5 Claims. (Cl. 260—2.1)

This invention relates to the synthetic anion exchange resins having large dimensions, and granular anion exchange resins which are not fractured in any process of their preparation. This invention is concerned, more particularly, with anion exchange resin prepared from the base polymer matrix comprising monovinyl arene compound and polyolefinic compound, and said matrix bonded to anion exchange groups through alkylene bridge after haloalkylation and amination. This invention is concerned, especially with anion exchange resins having at least two dimensions each in excess of 1 cm., having a shape of sheet, rod, tube etc., and with crack-proof granular anion exchange resins which are not cracked during the process of haloalkylation and amination.

There were known many synthetic anion exchange resins, but these materials are granules of small particle size, usually considerably less than 1 cm. in diameter. These granular resins have been used in a system in which they were either contacted with a solution until equilibrium has been reached or the solution has passed through a stationary bed of ion exchange granules. The purpose of these granular resins was absorption of anions from fluids and therefore anion exchange resins having large dimensions were not necessary. In the U.S. Patent No. 2,636,851 of W. Juda and W. A. MacRae, the ion exchange materials having at least two dimensions each in excess of 0.8 cm. were described, but this patent relates only to the preparation of moulded diaphragm of Dowex 50, Amberlite IRC–50 or Amberlite IRA–400, and homogeneous membrane of condensed phenol sulphonic acid and formaldehyde, and condensed melamine guanidine and formaldehyde and there is no description of the preparation of homogeneous styrene-divinylbenzene series anion exchange resins having large dimensions. But, in this patent, regarding the styrene-divinylbenzene resins, only the granules of insoluble infusible ion exchange resins are used for preparation of membrane, therefore, a binder was always necessary for their purpose. As the binder many sorts of materials such as thermoplastic polymers or phenolic condensates of considerable low molecular weight which comprises ion exchange groups were used. Therefore, in these cases, they could not be uniform polymeric materials and had many disadvantages. For instance, if the binder was a plastic material such as polystyrene, the surface of ion exchange resin was covered by the binder, and therefore, the functions and the stability of the ion exchange group were considerably decreased, so that they became inferior in electrochemical performance, that is, could not be superior ion exchange materials having high permselectivity for anion in electrolytic solution and high electric conductivity. When the granules of anion exchange resins of styrene-divinylbenzene series were covered by condensible binder, the stability and the function of ion exchange resins of styrene-divinylbenzene series were quite decreased. On the contrary, the anion exchange resins of this invention, however large the dimension of resin is, are homogeneous in their structure, entirely different from the usual ones, having high permselectivity for anion in electrolytic aqueous solution and high electric conductivity. In spite of these disadvantages that the ion exchange groups were covered by other material, usual method of the preparation of the ion exchange resin of large dimension could not help using a binder or other material especially for styrene-divinylbenzene series ion exchange resin. This was due to the fact that the base copolymer comprising monovinyl arene and polyolefinic compound was easily cracked during the polymerisation to prepare its large bulk polymer matrix and during the reaction period to introduce the anion exchange groups to said matrix.

This invention has overcome these essential defects. Any size of, any form of homogeneous anion exchange resins are prepared without cracking in all steps of their preparation. Therefore, the various electrochemical characteristics are very much improved.

In general, base polymer matrix of anion exchange resins are insoluble infusible copolymer comprising monovinyl arene compound and polyolefinic compound, and said matrix is bonded to amine groups, e.g. primary, secondary and tertiary amine, through alkylene bridge. These anion exchange resins are prepared, as described later in detail, by haloalkylating said insoluble infusible base polymer matrix and then reacting the haloalkylated base polymer matrix with amines. In this case, amine groups bonded to base matrix through alkylene bridge, —$CH_2NR_1R_2R_3$, are so hydrophilic that the resin should be made to be insoluble by the crosslinking agent. In the bulk and solution polymerizations for the preparation of base polymer matrix having large dimensions, or of the crack-proof granular base polymer, the larger the dimension of base polymer matrix and the greater the content of crosslinking agent, the more marked is the tendency toward cracking. The usual granular ion exchange resins are exemplified in the following patents, but these patents are not directed to unfractured anion exchange resins of large dimensions or crack-proof granular anion exchange resins. In the U.S. Patent Nos. 2,614,099, 2,591,574, 2,591,573, 2,597,439, 2,597,440, etc. the granular copolymerizates of styrene and divinylbenzene are first chloromethylated and the chloromethylated resins are aminated by primary, secondary or tertiary amine or their mixtures.

These known processes do not lead to the successful preparation of anion exchange resins having large dimensions and crack-proof granular anion exchange resins, especially to prepare the anion exchange membranes. The reason why the known processes are unsuccessful is that the base polymer matrix is easily cracked or fractured during the process of preparation. The circumstances are explained in detail below.

Ion exchange resins having at least two dimensions each in excess of 1 cm., could not be made by the usual method, because cracks or fractures occurred in the process of polymerization in bulk or solution of monovinyl arene and polyolefinic monomer, or in the process of haloalkylation and amination. Examples which show abovementioned crack and fracture are found in U.S. Patent No. 2,616,877. In the process of preparation of usual granular anion exchange resins, they used to make pearl-like beads between 40 and 60 mesh by suspension copolymerization of monovinyl arene and polyolefinic monomer in an aqueous solution containing a protective colloid. Cracking, however, was not as serious in that case as in the case of this invention, the purpose of which is to make resins having larger dimensions. According to the literature, the following are the cases in which cracks occur in the preparation of anion exchange resins having at least two dimensions in excess of 1 cm.

(1) Process in copolymerization of base polymer matrix comprising monovinyl arene and polyolefinic monomer.

(2) Process in haloalkylating said polymer matrix and in aminating said haloalkylated matrix.

(3) Process to drain-off and washing of chemical reagents after haloalkylation and amination.

The larger the size of the ion exchange resin, the more often it is necessary to have less swelling resins for its application than in case of small granules. For this purpose of obtaining less swelling resins, resins containing more polyolefinic monomer are required so that more crosslinking may be formed in the polymer matrix, while cracking occurs more easily during the step of haloalkylation and amination, as the amount of polyolefinic monomer is increased in the base polymer matrix. Following is the explanation of the abovementioned characteristic of anion exchange membranes of the styrene-divinylbenzene type.

It is impossible to obtain membrane type anion exchange resin by transforming usual granular copolymer of styrene and divinylbenzene bonded to amine groups through a methylene bridge, as it is insoluble in any solvent and not softened nor fusible by heat. It is, therefore, required to make, first, membrane type base polymer matrix of styrene and divinylbenzene, in order to make anion exchange membrane. Copolymer having a large area cannot be obtained, however, as it cracks during polymerization under ordinary conditions which are the same as or similar to that of the preparation of granular styrene and divinylbenzene series copolymer. In a special case, the monomers could be polymerized at a lower temperature and with a longer period of polymerization than usual, and an unfractured sheet form base polymer matrix could be obtained. But the sheet obtained in this way cannot be haloalkylated and aminated without cracks. Generally, the base polymer matrix swells in the step of haloalkylation and amination, and this swelling damages and destroys the structure of the said base matrix. In almost all cases, therefore, the sheet form matrix of abovementioned styrene-divinylbenzene copolymer is reduced to small pieces and so an anion exchange membrane can not be obtained successfully. Fractures occur more easily after the haloalkylation and amination. The sheet form anion resin is reduced suddenly into small pieces after the haloalkylation and amination when the resin is immersed into water to drain off the excess reagents. If a sheet form anion exchange resin is wanted, the washing off of the reagents must be carried out very carefully. The resin must be washed several times by using the several batches of solutions of gradually decreasing concentration. Furthermore this process usually takes a period of many days. These phenomena are described in the U.S. Patent No. 2,616,877.

However, we have now discovered a new method for the preparation of anion exchange resins having at least two dimensions each in excess of 1 cm., and crack-proof granular anion exchange resins, which will neither be damaged, cracked nor fractured during the step of polymerization and treating in which treating the anion exchange groups are introduced into the base polymer matrix, and in which the polymerizates undergo swelling and shrinking regardless of the dimension of the resins. According to our invention, the linearly polymerizable monovinyl arene monomer is first partially polymerized into a liquid mixture containing partially polymerized polymerizate and monomer, which mixture contains more than 0.1% of the said partially polymerized polymerizate, and next the crosslinking agent, such as polyolefinic compound, is added to this solution and thus a clear uniform solution is obtained. This mixed solution is subjected to the polymerization and, thereafter, the anion exchange groups are bonded to this base polymer matrix, and thus anion exchange resins having at least two dimensions each in excess of 1 cm. and crack-proof granules are obtained. This base polymer matrix shows quite different characteristics from the usual base polymer matrix which is obtained by the usual method of polymerization starting from the monomers themselves. For instance, the base polymer matrix obtained by our process does not crack in the step of haloalkylation and amination. The mechanical characteristics, such as the resistance to the bending etc. are also superior to the known polymerizates. Also usual base polymer matrix made of styrene and divinylbenzene are transparent, whereas that of our invention is white, turbid and opaque. They show different behavior in the case of extraction by the solvent for polystyrene, such as carbon tetrachloride. When extracted with solvent, there is some extract from the polymerizate prepared by our invention, whereas less extract from the polymerizate prepared by the usual process. This may be explained by the fact that the partially polymerized part would no longer copolymerize with the divinylbenzene after partial polymerization, but this partially polymerized part is bound to polymer matrix by forming the resinous three dimensionally crosslinked structure in the step of haloalkylation, and thus the polymerizate becomes quite insoluble and infusible against aqueous solution. Furthermore, as clearly described in the U.S. Patent No. 2,618,877, after the granular copolymerizate of monovinyl arene compound and polyolefinic compound is haloalkylated and aminated, granular anion exchange resins used to be shattered immediately. Therefore, in order to render less shattering of the resin, the haloalkylation and amination reaction should be carried out under special conditions, e.g. in the presence of acyclic polyhalohydrocarbon such as trichloroethylene. But these methods are not completely successful in preparing the anion exchange resins having large dimensions. By the same reason, the larger the dimension of the resin prepared by the known process, the more the accumulation of the strain due to the swelling and shrinking, and the resin will be shattered and spalled more easily. On the contrary, the resin prepared by this invention does not shatter or spall even if the resin is immersed into the fresh water directly after the amination. These are the main differences of physical and chemical characteristics of the base polymer matrix prepared by the usual process and by our own process. These relations are quite similar in all cases of preparation of other forms of aminated anion exchange resins such as rod, pipe etc.

Concrete method of our invention is shown as follows: A monovinyl arene compound monomer is partially polymerized to an extent of more than 0.1% by weight, and this solution which contains partially polymerized polymerizate and said monomer were mixed with polyolefinic compound with or without other inert material which is not polymerizable. This mixed solution was finally polymerized completely to form three dimensionally crosslinked insoluble infusible base polymer matrix. The inert material may be added during the preparation of partial polymerization. A catalyst may or may not be added in the step of partial polymerization and of polymerization with polyolefinic compounds. Instead of partial polymerization, polymer containing solution of monomer, which polymer is contained in more than 0.1% by weight, is also applicable. The monovinyl arene compound monomer is polymerized first partially and this polymer containing solution of said monomer is copolymerized with polyolefinic compound, the base matrix thus obtained does not undergo any spalling or shattering in polymerization and also in haloalkylation and amination or in the chemical change which causes swelling or shrinking. It, therefore, becomes now possible to make an anion exchange resin in any shape and any size. If a plasticizer is added in the course of polymerization as a substance which is indifferent to the polymerization, and the mixed solution is subjected to polymerization, finished base polymer matrix may be easily cut in any desired shape. The plasticizer can be extracted easily with its solvent after the polymerization. Also, filler or reinforcing material can be introduced as a substance which is not polymerizable to the polymerization, and thus renders the polymerizate to reinforce, and this is considered as a useful method for practical application. The monovinyl arene compounds are selected from the benzene and naphthalene series, i.e. they contain not more than 10 carbon atoms in the aromatic nucleus, which monovinyl-aromatic compounds may contain in addition to the vinyl radical, from 1 to 3 halogen or lower alkyl radicals other than a tertiary alkyl radical, attached to the aromatic nucleus. The alkyl substituents are preferably methyl radicals. Examples of such monovinyl-aromatic compounds are styrene, α-methylstyrene, ar-methylstyrene, ar-dimethylstyrene, ar-ethylvinylbenzene, ar-chlorostyrene, vinylnaphthalene, ar-methylvinylnaphthalene, ar-sec-butylstyrene and ar-trimethylstyrene. The polyolifinic compounds are selected from the compounds in which polymerizable double bonds exist, at least two in one molecule. Examples of polyolefinic compounds are divinylbenzene, ar-divinyltoluene, ar-divinylxylene, ar-divinylchlorobenzene, divinylnaphthalene, ar-divinylethylbenzene, divinylether, butadiene, isoprene, bimethallyl, biallyl, trivinylbenzene, cyclopentadiene and similar polyolefinic hydrocarbons.

In the preparation of base polymer matrix suitable for ion exchange resin from monovinyl arene compound and polyolefinic compound, monovinyl compound undergoes first partial polymerization in the presence or absence of catalyst generally at a temperature of 60–150° C. The ratio of partially polymerized polymerizate to the total solution is preferably 5–60% for the convenience in mixing with the polyolefinic with or without catalyst and also with or without a substance which is indifferent to the polymerization, and is mixed uniformly by stirring and polymerized until the polymerization completes. As a catalyst in this case, usual vinyl polymerization catalyst such as benzoyl peroxide, lauroyl peroxide, hydrogen peroxide, potassium persulphate, sodium perborate and/or ammonium persulphate can be used. This complete polymerization may be performed in a polymerization vessel in bulk or solution polymerization so that the finished polymer can have any shape such as sheet or rod form.

As a substance which is indifferent to the polymerization, a plasticizer may be used. The plasticizer is to be added preferably at a ratio of 20–50% to the monovinyl compound and afterwards polymerization is carried out completely. In this process, the polymerizate is worked easily in sheetlike form. The plasticizer can be extracted by a proper solvent from the cut sheet and thus the base polymer matrix of monovinyl arene compound and polyolefinic compound can be obtained in any desired shape and size. As a plasticizer, common plasticizers such as aromatic and aliphatic compounds may be used, but also a polymerizate of low molecular weight made of the same monomer as a raw material for the finished product may be used. A reinforcing material for the finished polymerizate such as suitable filler or web can be used as a substance which is indifferent to the polymerization.

In order to prepare the crack-proof granular base polymer matrix, the solution which contains partially polymerized polymerizate of monovinyl arene compound, is mixed uniformly with the polyolefinic compound. Then the polymerization is preferably accomplished by stirring, e.g. at a temperature of 50–150° C., a suspension of the said mixed polymer containing solution in an aqueous solution of protective colloid or thickening agent such as starch, gum tragacanth, or methyl cellulose etc. By such polymerization, while suspended in a liquid medium, insoluble base granular polymer matrix may be obtained directly in the form of rounded and nearly spherical granules. The size of granules may be controlled, e.g. by the rate of stirring and the proportion of protective colloid or thickening agent employed, so as to obtain nearly all of the product as granules of sizes suitable for introducing ion exchange groups.

The base polymer matrix obtained by the abovementioned processes is to be haloalkylated and then aminated. The haloalkylation involves introducing into the polymer matrix a plurality of bromoalkyl or chloroalkyl groups having the general formula $C_nH_{2n}X$ in which $n$ is an integer of value one to four and X represents an atom of chlorine or bromine. While groups containing one to four carbon atoms are involved in this invention, it is preferred to use those compounds in which chloromethyl group, $-CH_2Cl$ is added to the polymer matrix because the chloromethylated products are by far the most reactive. The carbon atoms in the group $-C_nH_{2n}X$ may be in straight or in a branched chain. The haloalkylation of the polymer matrix may be carried out in various ways. For instance, the polymer may be reacted with a mixture of an aldehyde and hydrochloric acid or with a mixture of dihalide and a Friedel-Crafts' catalyst. The introduction of halomethyl radical may be carried out most preferably when the polymerizate is reacted with chloromethylether or bromomethylether in the presence of a catalyst such as zinc chloride, zinc oxide, stannic chloride, aluminum chloride, tin, zinc and iron.

The halomethylation reaction, which occurs readily at temperature in the range from 10° to 120° C. or higher, is carried out while the polymerizate is being swollen by an organic solvent, such as tetrachloroethylene, chlorobenzene or an excess of haloalkylating reagent, the solvent being less reactive to the haloalkylating agent than the polymerizate. The reaction is advantageously carried out to the point at which the resin product contains an average of at least one halomethyl radical per six aromatic nuclei and is continued until the product contains an average of 0.8–1.2 halomethyl radical per aromatic nucleus. After the completion of the halomethylating reaction, the resin is washed with water. The halomethylated resin can be used directly in wet condition or dry. If the monovinyl arene compound in this invention contains one or more radicals combined to the nucleus, the polymerizate can be haloalkylated by halogenation of the alkyl radicals.

In the amination of the haloalkylated polymerizate, a weakly basic anion exchange resin is obtained when primary or secondary amine is used as aminating agent, and a strongly basic anion exchange resin is obtained when tertiary amine is used. The amination is carried out by immersing the haloalkylated polymerizate into the amines under room temperature or higher. It is preferable to swell the haloalkylated polymerizate prior to amination in order to accelerate the amination reaction. The swelling is carried out by immersing the polymerizate into a suitable solvent such as benzene, toluene, ethylenedichloride, trichloroethane, tetrachloroethylene. The amines are used as free bases and the reaction temperature ranges from 25° to 150° C.

The tertiary amine has following general formula

where $R_1$, $R_2$ and $R_3$ represents alkyl, phenyl, benzyl, propenyl, alkanol, alkandiol radicals. Typical amines are trimethylamine, triethylamine, dimethylbenzylamine, dimethylaniline, dimethylaminopropene, dimethylaminomethanol, dimethylethanolamine, dimethylisopropanolamine, methyldiisopropanolamine, dimethylpropanolamine, dioctylethanolamine, 1-dimethylamino-2,3-propandiol, 1-diethylamino-2,3-propandiol and diethylisopropanolamine, and are used individually or in mixture of those compounds.

The primary amine has following general formula

and the secondary amine

where $R_1$ and $R_2$ are the same as above mentioned,

Furthermore, those compounds such as polyalkylene polyamine in which both primary amine and secondary amine exist may be also used. These typical amines are used individually or in mixture. The typical amines are methylamine, dimethylamine, n-butylamine, isobutylamine, aniline, benzidine, o-, m-, and p-toluidine, xylidine, and naphthylamine, naphthalendiamine, benzylamine, dibenzylamine, phenylendiamine, benzylaniline, benzylethylamine, methylaniline, cyclohexylaniline, dicyclohexylamine, diethylentriamine, triethylentetramine, tetraethylenpentamine, 3,3′-iminobispropylamine, and propylendiamine.

As above mentioned, for the preparation of anion exchange resins having at least two dimensions each in excess of 1 cm. and crack-proof granular base polymer matrix, monovinyl arene compound is first polymerized partially and a solution which contains at least 0.1% of this partially polymerized polymerizate is prepared, to this solution polyolefinic compound is added as crosslinking agent and mixed uniformly and subjected to the complete polymerization, whereas the known process is merely copolymerization of the above cited monomers themselves. The base polymer matrix obtained by this invention is dimensionally very stable and does not shatter or spall in any step of preparation, such as shrinking, gelation during the polymerization, and in the steps of haloalkylation and amination. By these methods, uniform anion exchange resin having at least two dimensions each in excess of 1 cm. and crack-proof ion exchange resin is to be obtained which does not shatter or spall by the swelling and the shrinking during the introducing reaction of ion exchange group. The following examples illustrate the practice of the invention but are not to be construed as limiting the scope of the invention.

The following Examples 1–8 illustrate how the base polymer matrix suitable for anion exchange resins may be prepared.

EXAMPLE 1

400 parts of freshly distilled styrene was partially polymerized in the atmosphere of nitrogen and at a temperature of 100° C. for 12 hours. This partially polymerized polymerizate had a viscosity of about 900 poises and according to analysis styrene monomer was about 25% polymerized. To this solution 40 parts of divinylbenzene, 60 parts of ethylvinylbenzene, 120 parts of dimethylphthalate as a plasticizer and 0.4 part of benzoylperoxide as a polymerization catalyst were added and mixed uniformly. The solution was next deaerated and subjected to the solution polymerization in the atmosphere of nitrogen at a temperature of 100° C. for 48 hours. The polymerizate thus obtained was a white turbid, opaque solid and was easily cut into sheets.

When the same amounts and the same substances were used, namely, 400 parts of distilled styrene, 40 parts of divinylbenzene, 60 parts of ethylvinylbenzene were mixed with the addition of 120 parts of dimethylphthalate and 0.4 part of benzoylperoxide and subjected to the polymerization in a usual way, the polymerizate was cracked, spalled and shattered during the polymerization and the polymerizate having large dimension was hardly obtained. There were differences in physical characteristic between the polymerizates obtained by the present invention and by the usual process, the former being white, turbid and opaque, whereas the latter transparent.

EXAMPLE 2

400 parts of distilled styrene was partially polymerized in a polymerization vessel in the atmosphere of nitrogen. The partial polymerization was carried out at a temperature of 80° C. for 15 hours. The solution thus obtained had a viscosity of 80 poises and about 6% was polymerized according to the analysis. To this solution, 40 parts of divinylbenzene, 60 parts of ethylvinylbenzene, 120 parts of dibutylphthalate as a plasticizer and 0.4 part of benzoylperoxide was added and mixed uniformly. The solution was next deaerated and subjected to solution polymerization in the atmosphere of nitrogen at a temperature of 100° C. for 55 hours. The polymerizate thus obtained was a white, turbid and opaque solid and was easily cut into sheets. When the same amount and same substances were used, namely, 400 parts of distilled styrene, 40 parts of divinylbenzene, 60 parts of ethylvinylbenzene were mixed with the addition of 120 parts of dimethylphthalate and 0.4 part of benzoylperoxide and subjected to the polymerization in a usual way, the polymerizate was cracked, spalled and shattered during the polymerization and the polymerizate having large dimension was hardly obtained. There were differences in physical characteristic between the polymerizate obtained by this invention and by the usual process, the former being white, turbid and opaque, whereas the latter transparent.

EXAMPLE 3

400 parts of distilled styrene was partially polymerized in a polymerization vessel in the atmosphere of nitrogen. The partial polymerization was carried out at a temperature of 100° C. for 12 hours. The solution thus obtained had a viscosity of 900 poises and about 25% was polymerized according to the analysis. To this solution, 40 parts of divinylbenzene, 60 parts of ethylvinylbenzene and 0.4 part of benzoylperoxide were added and mixed uniformly. The mixture of the solution was, after deaeration, poured into a polymerization vessel, of hexahedron form, the dimension of the internal sizes being 50 cm. long, 50 cm. high, and the clearance between the both walls having the abovementioned size being 0.7 mm. The vessel was closed tightly by a lid and was immersed into a constant temperature bath and was subjected to bulk polymerization at a temperature of 100° C. for 50 hours. After the polymerization, a sheet-formed polymerizate having the dimension of about 50 cm. x 50 cm. area and 0.7 mm. thickness was obtained. The sheet was elastic, slightly white, turbid, and opaque and had no crack nor fracture.

When the same amounts and the same substances were polymerized in the same polymerization vessel at the same temperature of 100° C. in a usual way, there occurred many cracks, shatters and spalls during the polymerization and even a polymerizate having the area of 5 cm. x 5 cm. could not be obtained. The fragment of this polymerizate was transparent.

EXAMPLE 4

The mixture of the solution which was deaerated in the Example 2 was placed into the same polymerization vessel and webs of glass fibre were inserted into the solution. The reinforced polymerizates were obtained.

EXAMPLE 5

The block polymerizate which was obtained in the Example 1 was worked by lathe to form any shape such as rod or pipe. After the work, the plasticizer was extracted with alcohol and thus rodlike or pipelike polymerizate was obtained.

EXAMPLE 6

400 parts of distilled styrene was partially polymerized according to Example 1. To this solution 20 parts of divinylbenzene, 30 parts of ethylvinylbenzene and 20 parts of butadiene were added as a crosslinking agent, and 0.4 part of benzoylperoxide as a polymerization catalyst. This mixed solution was subjected to solution polymerization at a temperature of 100° C. for about 15 hours in a pressure tight vessel.

A polymerizate of similar physical characteristic to those of Example 1 was obtained.

EXAMPLE 7

Instead of the solution which contains a certain percent of partially polymerized polymerizate in the Examples 1-6, 60 parts of commercial polystyrene was pulverized and dissolved into 340 parts of distilled styrene, and this polymer containing solution was used for copolymerization. The further steps were the same as described in the Examples 1-6 and the same polymerizate was obtained.

EXAMPLE 8

A mixture of 370 parts of freshly distilled styrene and 30 parts of m-vinyltoluene was partially polymerized in the atmosphere of nitrogen and at a temperature of 100° C. for 11 hours. This partially polymerized polymerizate had a viscosity of about 800 poises and according to the analysis, styrene and vinyltoluene monomer was about 22% polymerized. To this solution, 40 parts of divinylbenzene, 60 parts of ethylvinylbenzene, and 120 parts of dimethylphthalate as a plasticizer were added and mixed uniformly. The mixed solution was subjected to solution polymerization in the atmosphere of nitrogen at a temperature of 100° C. for 48 hours. The polymerizate thus obtained was a white, turbid and opaque solid and was easily cut in sheets as in Example 1.

The next Example 9 illustrates how the base polymer matrix of preceding Examples 1-8 may be chloromethylated and aminated.

EXAMPLE 9

Polymer sheets having the dimension of 0.7 mm. thick and 10 cm. x 10 cm. in area were prepared by the process described in the Examples 1-8. These ten sheets were placed into a reaction vessel equipped with a reflux condenser, an agitator, and a guide so that the liquid was circulated in order to promote the reaction between the sheets and liquid. 1000 cc. of chloromethylether was poured into the vessel and the vessel was heated for an hour at a temperature of 50° C. and cooled to the room temperature. 140 grams of zinc chloride were added to the liquid as a catalyst and the sheets and the liquid were heated together at a temperature of 24° C. for 7 hours, the liquid being circulated, and thereafter kept at room temperature for 50 hours. The sheets were then taken out from the liquid and washed by acetone and water. The chloromethylated sheets were then placed into the reaction vessel which contained a mixture of 300 cc. of dimethylethanolamine and 300 cc. of water and heated together at a reflux temperature of the mixed solution for 7 hours. The sheets were aminated in this way and washed first by fresh water, and next by 0.5 N sodium chloride solution until the supernatant solution became neutral, and stored in the sodium chloride solution. The transport number of chlorine ion of this anion exchange sheet was measured in 1.5 N sodium chloride solution at a temperature of 25° C., and the specific electric conductivity was measured in 0.5 N sodium chloride solution at a temperature of 25° C. These results were illustrated in following table.

Table

| | Transport number of chlorine ion in 1.5 N NaCl solution at 25° C. (percent) | Specific electric conductivity in 0.5 N NaCl solution at 25° C. ($\Omega^{-1}$ cm.$^{-1}$)×10³ |
|---|---|---|
| Anion exchange resin from the base polymer matrix of Example 1 | 85 | 25 |
| Anion exchange resin from the base polymer matrix of Example 2 | 81 | 27 |
| Anion exchange resin from the base polymer matrix of Example 3 | 89 | 23 |
| Anion exchange resin from the base polymer matrix of Example 4 | 89 | 19 |
| Anion exchange resin from the base polymer matrix of Example 5 | 85 | 25 |
| Anion exchange resin from the base polymer matrix of Example 6 | 83 | 30 |
| Anion exchange resin from the base polymer matrix of Example 8 | 89 | 23 |

The anion exchange resin sheets prepared by these processes did not undergo any shattering, spalling nor crumbling by the swelling and shrinking during the reaction of chloromethylation and amination.

An attempt was made to get a sheetformed polymerizate according to the ordinary known process of polymerization, but only a sheet of 0.7 mm. thick and several square centimeters in area was obtained. This small sheet was subjected to the chloromethylation under the same condition as described in this example. The sheet was shattered into small pieces of about 1 cm., and it was unable to get a chloromethylated sheet of a large area. In another attempt, a sheet of 0.7 mm. thick and 10 cm. x 10 cm. in area was obtained by the known polymerization process using lauroyl-peroxide as a catalyst, which process was the same as described in the Example 8. The sheet thus obtained was transparent, whereas the sheet obtained by this invention was white, turbid and opaque. The sheet was then subjected to the reaction of chloromethylation, but due to the uneven swelling during the reaction, it was shattered into small pieces of about 1 mm. and it was unable to get a sheet or block of large dimension.

A polymerizate of any shape was to be obtained according to the process of the invention described in the Examples 1-8, and these polymerizates were chloromethylated and then aminated, and thus anion exchange resins of any shape were obtained.

EXAMPLE 10

This example illustrates that the chloromethylation reaction velocity was promoted by swelling the polymerizate before or during the chloromethylation reaction.

A polymerizate having the dimension of 0.7 mm. thick and 10 cm. x 10 cm. in area was obtained by the process of the invention described in the Examples 1-8. The chloromethylation was accomplished after the sheet was immersed and swollen in tetrachloroethylene, or the chloromethylation was accomplished in the presence of swelling agent. In both cases, the chloromethylation was carried out faster than as in Example 9.

EXAMPLE 11

This example illustrates that the chloromethylation of the polymerizate of large dimension was carried out favourably when chloromethylether was used together with ligroin. A polymerizate having the dimension of 0.7 mm. thick and 30 cm. x 30 cm. in area was obtained according to the process of the invention described in the Examples 1-8. The sheet was chloromethylated by the mixed solution of equal parts of chloromethylether and ligroin. The reaction was carried out slowly but smoothly.

EXAMPLE 12

400 parts of distilled styrene was polymerized partially at a temperature of 100° C. for 10 hours in the atmosphere of nitrogen. The solution was 20% polymerized according to the analysis. The solution was then added with 40 parts of divinylbenzene and 60 parts of ethylvinylbenzene and mixed well. The solution was then mixed with 10,000 parts of aqueous solution which contained 0.7% of sodium salt of carboxylmethylcellulose and stirred well. The whole solution was then subjected to the suspension polymerization and the temperature was raised from 60° C. to 90° C. in 60 hours. After the polymerization, granular polymerizates were obtained, and they had the same physical characteristic as the polymerizate in the preceding examples, being different from those obtained by the ordinary known process.

About 90% of the granular polymerizates had a size between 20 and 40 mesh, and these granules were subjected to the amination after they were chloromethylated according to the process described in Example 10 and then thrown into the water. There was no shattering, spalling and cracking of the granules observed during the chloromethylation, amination and washing, whereas the granules obtained by the ordinary process cracked during these reactions. The ratio of the cracked granules to the initial ones were as follows:

| Granules obtained by— | percent of granules cracked |
|---|---|
| The process of this invention | 1 |
| The usually known process | 93 |

As shown above, there were remarkable differences in physical and chemical characteristics between the polymerizates obtained by the process of this invention and the polymerizates obtained by the ordinary known process, not only in the case of sheetform resins but also in the case of granular resins.

What we claim is:

1. A solid unfractured anion exchange resin sheet comprising a three dimensionally cross-linked sheet form polymer matrix bonded to anion exchange groups, said sheet form matrix being sliced from a block form matrix into sheet form matrix, and said block form matrix being a polymerization product of a solution mixture of styrene, polystyrene, divinylbenzene and dialkylphthalate, and said anion exchange groups being bonded to said matrix by chloromethylating said matrix so that there is an average of from 0.2 to 1.2 chloromethyl groups per aromatic nucleus, and then aminating said chloromethylated matrix so that there exist in the reaction mixture at least one mole of amine for each chloromethyl group in said matrix.

2. The resin sheet according to claim 1 wherein the number of carbon atoms in each alkyl radical of the dialkylphthalate is from 1 to 8.

3. A solid unfractured anion exchange resin sheet comprising a three dimensionally cross-linked sheet form polymer matrix bonded to anion exchange groups, said sheet form matrix being sliced from a block form matrix into sheet form matrix, and said block form matrix being a polymerization product of a solution mixture of styrene, polystyrene, divinylbenzene, and dialkylphthalate as a plasticizer, and said block form matrix being sliced into sheet form matrix, and said anion exchange groups being bonded to said matrix by chloromethylating said sheet form matrix in such an amount that there exist an average of from 0.2 to 1.2 chloromethyl groups per aromatic nucleus and then aminating said chloromethylated sheet form matrix with at least one member selected from the group consisting of trimethylamine, dimethylethanolamine, diethylenetriamine, and tetraethylenepentamine in such an amount that there exist in the reaction mixture at least one mole of said amine for each chloromethyl group in said matrix.

4. A solid unfractured anion exchange resin sheet comprising a three dimensionally cross-linked sheet form polymer matrix bonded to anion exchange groups, said sheet form matrix being sliced from a block form matrix, and said block form matrix being a polymerization product of a solution mixture of styrene, polystyrene, divinylbenzene, and dialkylphthalate as a plasticizer, and said anion exchange resin sheet being chloromethylated and then aminated by at least one member selected from the group consisting of trimethylamine, dimethylethanolamine, diethylenetriamine and tetraethylenepentamine, the number of anion exchange groups being one to five for every four aromatic nuclei in said matrix.

5. The process for preparing an anion exchange resin sheet comprising the steps of polymerizing in block form a solution mixture of styrene, polystyrene, divinylbenzene and dialkylphthalate, slicing the polymerized block form matrix into sheet form matrix and chloromethylating the sheet form matrix in such an amount that there exist an average of from 0.2 to 1.2 chloromethyl groups per aromatic nucleus and then aminating said chloromethylated matrix with at least one member selected from the group consisting of trimethylamine, dimethylethanolamine, diethylenetriamine, and tetraethylenepentamine in such an amount that there exist in the reaction mixture at least one mole of said amine for each chloromethyl group in said sheet form matrix.

References Cited in the file of this patent

UNITED STATES PATENTS

| 2,318,845 | Feagin et al. | May 11, 1943 |
| 2,418,978 | Mertens | Apr. 15, 1947 |
| 2,420,284 | Carswell | May 6, 1947 |
| 2,468,094 | Marks | Apr. 26, 1949 |
| 2,500,598 | Alexlrod | Mar. 14, 1950 |
| 2,527,300 | Dudley | Oct. 24, 1950 |
| 2,591,573 | McBurney | Apr. 1, 1952 |
| 2,591,574 | McBurney | Apr. 1, 1952 |
| 2,616,877 | McMaster | Nov. 4, 1952 |
| 2,636,851 | Juda et al. | Apr. 28, 1953 |
| 2,642,417 | Wheaton et al. | June 16, 1953 |
| 2,697,080 | D'Alelio | Dec. 14, 1954 |
| 2,700,185 | Lee | Jan. 25, 1955 |
| 2,730,768 | Clarke | Jan. 17, 1956 |
| 2,731,408 | Clarke | Jan. 17, 1956 |
| 2,731,411 | Clarke | Jan. 17, 1956 |
| 2,732,350 | Clarke | Jan. 24, 1956 |
| 2,734,044 | Bezman | Feb. 7, 1956 |

OTHER REFERENCES

Chemical and Engineering News, vol. 30, No. 43, October 27, 1952, p. 4513. Copy in Scientific Library.